US012338952B2

(12) United States Patent
Jahn

(10) Patent No.: US 12,338,952 B2
(45) Date of Patent: Jun. 24, 2025

(54) PRESSURE VESSEL WITH MULTIPLE LATERAL OUTFLOW OPENINGS

(71) Applicant: Andreas Jahn, Tambach-Dietharz (DE)

(72) Inventor: Andreas Jahn, Tambach-Dietharz (DE)

( * ) Notice: Subject to any disclaimer, the term of this patent is extended or adjusted under 35 U.S.C. 154(b) by 248 days.

(21) Appl. No.: 18/051,863

(22) Filed: Nov. 1, 2022

(65) Prior Publication Data

US 2023/0133969 A1 May 4, 2023

(30) Foreign Application Priority Data

Nov. 2, 2021 (DE) ......................... 102021212342.2

(51) Int. Cl.
*F17C 1/14* (2006.01)
*F17C 13/04* (2006.01)

(52) U.S. Cl.
CPC ................ *F17C 13/04* (2013.01); *F17C 1/14* (2013.01); *F17C 2201/0104* (2013.01); *F17C 2201/0119* (2013.01); *F17C 2201/032* (2013.01); *F17C 2201/058* (2013.01); *F17C 2203/0617* (2013.01); *F17C 2203/0646* (2013.01); *F17C 2205/0323* (2013.01); *F17C 2205/0332* (2013.01); *F17C 2205/0394* (2013.01);

(Continued)

(58) Field of Classification Search
CPC .............. F17C 13/04; F17C 2201/0119; F17C 2201/032; F17C 2203/0617; F17C 2205/0323; F17C 2221/013; F17C 2270/0736; F17C 2201/0104; F17C 2201/058; F17C 2203/0646; F17C 2205/0332; F17C 2205/0394; F17C 2223/0123; F17C 2223/033; F17C 2223/035; F17C 2260/012; F17C 2260/013; F17C 2260/036; F17C 1/14
See application file for complete search history.

(56) References Cited

U.S. PATENT DOCUMENTS 873,984 A * 12/1907 Bobrick ............. F16K 37/0066
137/557
3,589,397 A * 6/1971 Wagner .................. F16K 35/00
220/86.4

(Continued)

FOREIGN PATENT DOCUMENTS

DE 20221173 U1 8/2005
EP 0 050 947 A2 5/1982

(Continued)

OTHER PUBLICATIONS

Germany Office Action, mailing date Jul. 26, 2022 for corresponding German Application No. DE 10 2021 212 342.2 with English translation (6 pages).

(Continued)

*Primary Examiner* — Frederick C Nicolas
(74) *Attorney, Agent, or Firm* — Marshall & Melhorn, LLC

(57) ABSTRACT

The invention relates to a pressure vessel (1), comprising a vessel body (3), wherein at an upper end of the vessel body (3) an end region (2) is formed in one piece with the vessel body (3), which has an opening (O), and a fastening structure (9) for a valve (6) formed on the inside of a wall (2.1) surrounding the opening (O) of the end region (2). According to the invention, two outflow openings (SO) are formed opposite each other in the wall (2.1) surrounding the opening (O) of the end region (2).

19 Claims, 7 Drawing Sheets

(52) U.S. Cl.
CPC .................. *F17C 2221/013* (2013.01); *F17C 2223/0123* (2013.01); *F17C 2223/033* (2013.01); *F17C 2223/035* (2013.01); *F17C 2260/012* (2013.01); *F17C 2260/013* (2013.01); *F17C 2260/036* (2013.01); *F17C 2270/0736* (2013.01)

(56) References Cited

U.S. PATENT DOCUMENTS

| | | | | | |
|---|---|---|---|---|---|
| 3,788,511 | A * | 1/1974 | Marsh | F16J 12/00 | 220/23.91 |
| 3,817,302 | A * | 6/1974 | Kowal | F17C 13/123 | 141/383 |
| 3,917,115 | A * | 11/1975 | Travers | B63C 11/18 | 220/586 |
| 4,033,378 | A * | 7/1977 | Pauliukonis | F16K 1/307 | 137/503 |
| 4,573,611 | A * | 3/1986 | O'Connor | F16K 1/36 | 251/111 |
| 4,586,634 | A * | 5/1986 | Minter | F17C 13/04 | 222/509 |
| 4,676,271 | A * | 6/1987 | Fujikawa | F16K 31/38 | 251/44 |
| 5,009,249 | A * | 4/1991 | Fisher | G05D 16/10 | 251/74 |
| 5,036,876 | A * | 8/1991 | Jernberg | F17C 7/00 | 137/454.6 |
| 5,150,741 | A * | 9/1992 | Valy | G05D 7/0126 | 141/46 |
| 5,295,502 | A * | 3/1994 | Lane | F17C 13/04 | 137/315.04 |
| 5,456,445 | A * | 10/1995 | Griffin | F17C 13/04 | 251/117 |
| 5,657,790 | A * | 8/1997 | Mohn | F16K 1/307 | 137/533.25 |
| 6,230,737 | B1 * | 5/2001 | Notaro | F17C 13/04 | 137/614.19 |
| 6,595,486 | B2 * | 7/2003 | Chen | F16K 1/302 | 137/614.2 |
| 6,607,007 | B1 * | 8/2003 | Hull | F16K 1/306 | 251/83 |
| 6,957,799 | B2 * | 10/2005 | Heilmann | F17C 13/04 | 137/614.2 |
| 7,114,699 | B2 * | 10/2006 | Hull | F16K 1/306 | 251/274 |
| 8,225,816 | B2 * | 7/2012 | Denis | F16K 1/306 | 137/613 |
| 11,406,944 | B2 * | 8/2022 | Danieli | B67C 3/2614 | |
| 11,986,781 | B2 * | 5/2024 | Danieli | F17C 13/04 | |
| 12,140,273 | B2 * | 11/2024 | Jahn | F17C 13/04 | |
| 2004/0107951 | A1 | 6/2004 | D'Arcy et al. | | |
| 2004/0188449 | A1 * | 9/2004 | Thompson | F17C 1/00 | 220/723 |
| 2008/0308181 | A1 * | 12/2008 | Denis | F17C 13/04 | 141/360 |
| 2009/0078321 | A1 * | 3/2009 | Arnott | G05D 16/103 | 137/315.04 |
| 2011/0056472 | A1 * | 3/2011 | Stone | F17C 13/04 | 220/581 |
| 2012/0181287 | A1 * | 7/2012 | Holbeche | G05D 16/103 | 220/582 |
| 2016/0348847 | A1 | 12/2016 | Wilder et al. | | |
| 2020/0360875 | A1 * | 11/2020 | Danieli | A23L 2/54 | |
| 2023/0184389 | A1 * | 6/2023 | Jahn | F17C 13/04 | 137/561 R |

FOREIGN PATENT DOCUMENTS

| | | | |
|---|---|---|---|
| WO | WO 2021/099542 | A1 | 3/2021 |
| WO | WO 2021/137206 | A1 | 7/2021 |

OTHER PUBLICATIONS

Extended European Search Report, dated Mar. 29, 2023 for corresponding European Application No. 22204870.4 with English translation (total 11 pages).
First Australian Examination Report, dated Oct. 23, 2023 for corresponding Australian standard patent application No. 2022263483 (total 4 pages).

* cited by examiner

PRESSURE VESSEL WITH MULTIPLE LATERAL OUTFLOW OPENINGS

CROSS-REFERENCE TO RELATED APPLICATION

This application claims priority to German application no. DE 10 2021 212 342.2 filed on Nov. 2, 2021, which is hereby incorporated by reference in its entirety.

FIELD OF INVENTION

The invention relates to a pressure vessel.

BACKGROUND

A pressure vessel and a method for manufacturing a pressure vessel are known from the prior art, as described in WO 2021/099542 A1. The pressure vessel comprises a vessel body with a vessel base arranged at a lower end and formed integrally with the vessel body, an end piece with an opening arranged at an upper end of the vessel body and formed integrally with the vessel body, a connection geometry arranged on the outside on a wall surrounding the opening of the end piece, wherein the wall with the connection geometry forms a connection which is set up to be or become coupled in a media-tight manner with a corresponding further connection, a fastening structure for a valve formed on the inside of the wall surrounding the opening of the end piece, and a pressure relief device arranged in a pressure relief opening of the end piece or a pressure relief opening of the container body.

DE 202 21 173 U1 describes a C02 capsule and a device for automatically filling the capsule. Provided are a one-way valve which is mounted to the 12 gr. CO2 capsule, the 12 gr. CO2 capsule with the one-way valve created with the mounting of the one-way valve, and a filling device for filling the 12 gr. CO2 capsule with liquid carbon dioxide gas.

A pressure bottle for a paintball marker is known from US 2011/0056472 A1. A device for use in paintball comprises a modified pressure bottle having a valve assembly mounted “integral” with the neck thereof and independent of the connecting structure for connecting the bottle to a paintball marker.

SUMMARY

The object of the invention is to provide a novel pressure vessel.

The object is achieved according to the invention by a pressure vessel with the features of claim 1.

Advantageous embodiments of the invention are the subject of the dependent claims.

A pressure vessel has a vessel body. At an upper end of the container body, an end region is formed integrally with the container body. This end portion formed integrally with the container body may also be referred to as an end piece. The end portion has an opening. The pressure vessel also has a mounting structure for a valve formed on the inside of a wall surrounding the opening of the end region.

According to the invention, two outflow openings are formed in the wall surrounding the opening of the end region, in particular opposite each other.

The pressure vessel, for example a pressurised gas vessel, enables integration of the valve or a valve function into the end region and, in particular, direct media-tight coupling of the pressure vessel with a further connection, for example a connection of an application.

In contrast to the state of the art, this enables a lateral outflow of a medium, for example gas, for example carbon dioxide, located in the container body. The medium flows out through the valve and then through the two outflow openings in the wall and into the application. The solution according to the invention is therefore particularly suitable for applications in which such a lateral outflow is required.

In contrast to other solutions in which the valve protrudes from the container body, thereby allowing lateral outflow from the valve, the solution according to the invention achieves a smaller overall height, since the valve can be or is arranged almost completely in the container body. For example, only a collar-shaped upper section of a valve body of the valve protrudes from the container body, which lies sealingly against an end face of the wall of the end region.

In particular, the pressure vessel also has the valve, which is arranged in the end region, in particular screwed into it. The valve is designed as a non-return valve, for example.

A valve body of the valve has in particular exactly one passage opening, which is formed radially from an inner side in the direction of an outer side of the valve body. This enables a simple manufacture of the valve body. In addition, the valve body is particularly stable, since it has only a single passage opening and thus additional weakening caused by multiple passage openings is avoided. The valve body can therefore be formed, for example, with a lower material cost and/or from a different, in particular less expensive, material, for example aluminium or brass.

In other embodiments, the valve may have several such passage openings, each of which is formed radially from the inside towards the outside of the valve body.

The passage opening or the respective passage opening in the valve body is positioned in particular at the level of the outflow openings in the end region. This ensures short flow paths between the passage opening in the valve and the two outflow openings.

Alternatively, the passage opening or the respective passage opening can also be positioned offset in height from the height of the outflow openings in the end region.

For example, the passage opening opens into a distributor groove formed circumferentially on the outside of and in the valve body and/or an inner opening edge of the respective outflow opening is arranged on a groove bottom of a circumferential distributor groove formed on the inside of the wall of the end section. This ensures a uniform distribution of the medium flowing out of the one passage opening in the valve body to the two outflow openings in the wall of the end section and thus a uniform outflow of the medium from both outflow openings.

If the passage opening or the respective passage opening is positioned offset in height from the height of the outflow openings in the end region, the distributor groove, for example, is correspondingly wide or a connecting channel is provided between the passage opening or the respective passage opening and the distributor groove or another fluidic connection is provided between the passage opening or the respective passage opening and the distributor groove.

In particular, the fastening structure has an internal thread arranged on the inside of the wall. In one possible embodiment, the valve body has an external thread corresponding to the internal thread of the fastening structure. In the state screwed into the internal thread, in particular completely screwed in, i.e. up to a predetermined end position, the valve body is arranged in the region of the opening of the end region, projects into the end region starting from the opening, lies against the end region in a media-tight manner and has a receiving opening. A sealing plunger is arranged in the receiving opening, which in a closed position closes the passage opening in a media-tight manner, i.e. either directly or indirectly closes it in a media-tight manner, and in an open position releases the passage opening. The valve has in particular a support element connected to the valve body or formed on the valve body and a spring element arranged inside the valve body, which is supported with a first end on the support element and with an opposite second end on the sealing plunger, wherein the spring element is tensioned, in particular compressed, when the sealing plunger moves from the closed position into the open position.

Such a design of the valve with the valve body and the further valve components, which are held inside or on the valve body, enables a particularly simple assembly of the valve as a whole in the end area. Since the valve does not have a retaining function, in contrast to solutions known from the state of the art with a separate valve, the valve body can be significantly weaker in terms of its material thickness and material quantity.

For example, at least one seal, for example in the form of an O-ring or a shaft seal, is arranged between the valve body and the end region. In particular, one such seal is arranged in each case between the valve body and the end region above and below the passage opening. The seal above the passage opening prevents the medium from flowing out of the opening in the end region upwards out of the container body. The seal below the passage opening prevents the medium from flowing between the wall of the end region and the valve body and thus past the valve in the direction of the outflow openings in the wall of the end region. In one possible embodiment, two seals are also arranged between the valve body and the sealing plunger, for example in the form of an O-ring or a shaft seal in each case. These seals are very reliable and available at low cost. In this case, one seal is arranged above the passage opening to prevent the medium from flowing out of the receiving opening upwards, so that it is ensured that the medium only flows out laterally via the two lateral outflow openings. The other seal is located below the passage opening. With it, the fluidic connection between the passage opening and the area of the receiving opening fluidically connected to the interior of the container body is prevented in the closed position of the sealing plunger and released in the open position of the sealing plunger.

For example, the passage opening is fluidically connected to the receiving opening and the sealing plunger closes the receiving opening and thereby also the passage opening in a media-tight manner in the closed position and releases the receiving opening at least in sections in the open position and thereby also releases the passage opening. In this embodiment, the passage opening is thus closed in a media-tight manner by means of the sealing plunger in the closed position, in particular indirectly, by closing the receiving opening and thus the passage opening fluidically connected thereto in a media-tight manner.

In one possible embodiment, the support element and/or the valve body has an inflow opening. This allows a medium located inside the container body to flow into the receiving opening in the valve body, at least when the sealing plunger is in the open position, and thus, at least when the valve plunger is in the open position, allows the medium to flow in the direction of the passage opening.

In one possible embodiment, the valve body has a pressure compensation opening. This enables the valve plunger to be moved into the open position and back into the open position, in particular when the support element is closed, whereby pressure equalisation takes place between a region of the receiving opening below the sealing plunger and the interior of the container body.

In particular, the container body has a container bottom arranged at a lower end and formed in one piece with the container body. In particular, the one-piece design of the entire container body, including the container base and the end region, achieves a particularly high pressure stability with little effort, in particular with little material effort, as connections, for example weld seams, which represent weak points, are avoided.

The container body has, in particular, a connection geometry arranged on the outside of a wall surrounding the opening of the end region, for example an external thread, a latching arrangement or a quick-release fastener, wherein the wall with the connection geometry forms a connection which is set up to be or to be coupled in a media-tight manner with a corresponding further connection. Due to the design of the connection geometry, for example a so-called ACME thread, at the end region, the valve can be omitted as a separate component. Compared to solutions known from the state of the art with a separate valve, this means that a part count of individual parts can be reduced, and a valve body made of brass, for example, can be dispensed with or at least be significantly thinner in terms of its material thickness and material quantity. Thus, material and cost expenditure can be significantly reduced. For example, a saving in measurement of up to 200 g per pressure vessel with valve can be achieved.

Furthermore, due to the design of the connection geometry at the end area and thus at the pressure vessel, a reliable and improved media tightness can be achieved, which results in particular from a reduction of a number of joints and their sealing compared to the solutions known from the state of the art with a separate valve. Furthermore, the assembly effort is reduced.

Also, a seal provided in the prior art for sealing the valve against the pressure vessel, in particular a so-called O-ring, can be omitted, which also results in a reduction in the part count of individual parts and in a cost reduction.

Due to the integration of the valve into the pressure vessel and the formation of the external thread at the end area, the valve no longer has to be made of brass. For example, both the pressure vessel, i.e. the vessel body with vessel bottom and the end area, and the components of the valve are made of aluminium. On the one hand, this has the advantage that particularly low costs can be achieved and, on the other hand, that at least all components responsible for the tightness of the medium are made of the same material with the same coefficient of thermal expansion, and thus different expansions and resulting leaks with temperature changes are avoided. Also, when the components of the valve and the pressure vessel are formed, easy and complete recycling is possible. Alternatively, the valve is made of brass or another material.

In the process for manufacturing a pressure vessel described above, the vessel body and the end region are manufactured together from a material blank in a roll forming process. Furthermore, the fastening structure for the valve and in particular also the connection geometry are created by means of machining and/or forming, in particular during the roll forming process, and/or application of material and/or other suitable processes in the area of the end region. Furthermore, the two outflow openings are formed in the wall of the end region. Subsequently, the valve is attached to the end region in the area of the opening. The pressure vessel can be produced particularly easily and with high quality by means of the roll forming process. The creation of the fastening structure and the fastening of the valve are also particularly simple, reliable and can be realised at low cost.

The pressure vessel can, for example, also have an overpressure protection. For example, this overpressure protection is arranged in the valve. Alternatively, this overpressure protection is arranged, for example, in an overpressure opening formed in the container base. With a corresponding design of the container bottom, for example with a corresponding recess, this enables an integrated arrangement of the overpressure protection without it protruding over an outer edge of the pressure container. This increases protection against mechanical damage to the overpressure protection. Furthermore, the space required to accommodate the pressure vessel in an application can be reduced and assembly of the pressure vessel in the space is simplified.

The overpressure protection comprises, for example, a bursting disc which is secured, for example, by a screw comprising a venting bolt. Such a design of the overpressure protection is particularly simple, inexpensive and reliable. For example, the overpressure protection is designed for a release pressure of 250 bar. However, any other release pressure values are also possible.

For example, the bursting disc is fluidically coupled to an interior of the pressure vessel and is held, for example, at the edge by the screw inside which a venting bolt is formed or arranged. If the trigger pressure is exceeded, the bursting disc is mechanically destroyed and releases a fluidic connection between the venting bolt and the interior of the pressure vessel, so that fluid, for example gas, located inside the pressure vessel can escape.

For example, the overpressure opening comprises an internal thread corresponding to an external thread of the screw, into which the screw is screwed. This enables a particularly simple and secure fastening of the overpressure protection. For example, the internal thread is produced by machining. However, the internal thread can also be produced in a forming process, for example a roll forming process, during the forming of the container base. Alternatively, other processes for producing the internal thread are also possible.

In one possible embodiment of the method for manufacturing the pressure vessel, the overpressure opening is created in the vessel bottom by means of machining and/or forming, in particular during the roll forming process, and/or application of material and/or other suitable processes, and subsequently the overpressure protection is attached to the overpressure opening. The creation of the overpressure opening and the fastening of the overpressure protection are particularly simple, reliable and can be realised at low cost.

BRIEF DESCRIPTION OF THE DRAWINGS

Examples of embodiments of the invention are explained in more detail below with reference to drawings.

Corresponding parts are marked with the same reference signs in all figures.

DETAILED DESCRIPTION OF SPECIFIC EMBODIMENTS

Figure 1:
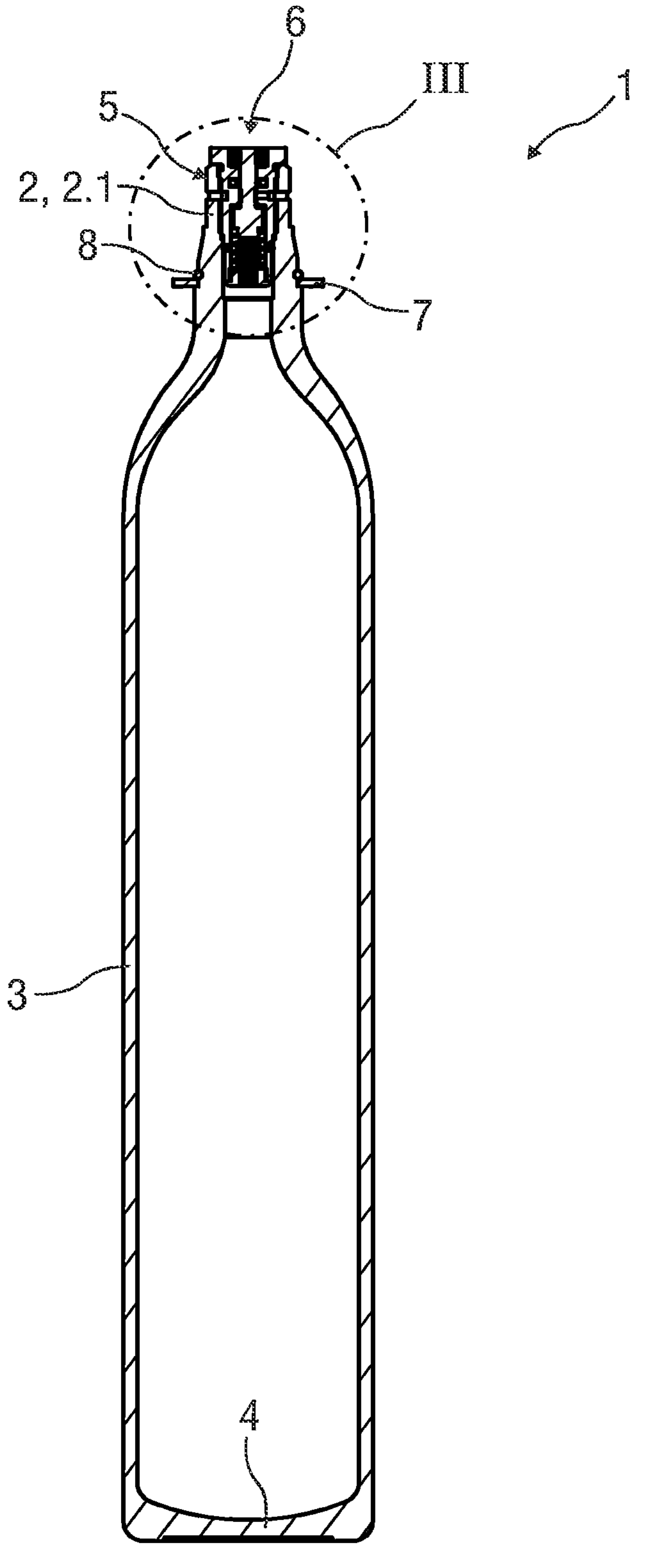
FIG. 1 schematically shows a longitudinal sectional view of an embodiment of a pressure vessel, FIG. 2 schematically shows a top view of the design of the pressure vessel according to FIG. 1, FIG. 3 schematically shows a detail view of detail III in FIG. 1, FIG. 4 schematically shows a longitudinal sectional view of a container body of the design of the pressure vessel according to FIG. 1, FIG. 5 schematically shows a detail view of detail V in FIG. 4, FIG. 6 schematically shows a longitudinal sectional view of a valve of the pressure vessel embodiment according to FIG. 1, and FIG. 7 schematically shows a longitudinal sectional view of a valve of a further embodiment of the pressure vessel.

FIG. 1 shows a longitudinal sectional view of an embodiment of a pressure vessel 1.

Figure 2:
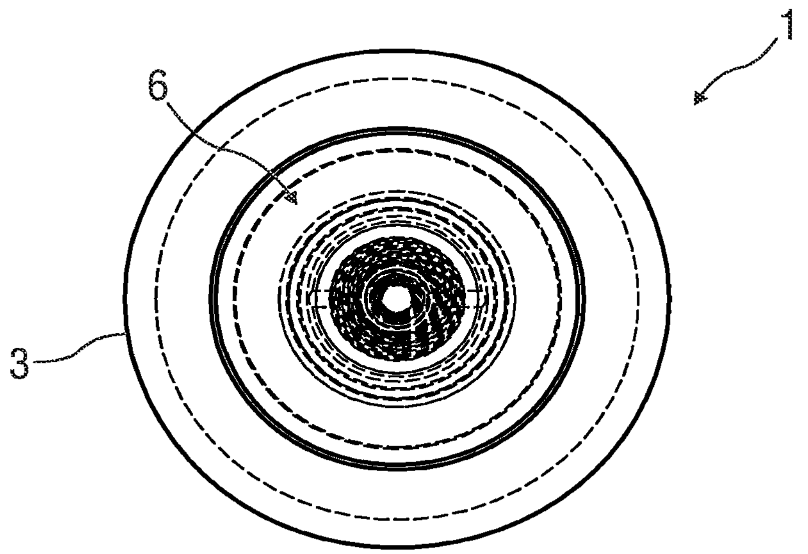
Figure 3:
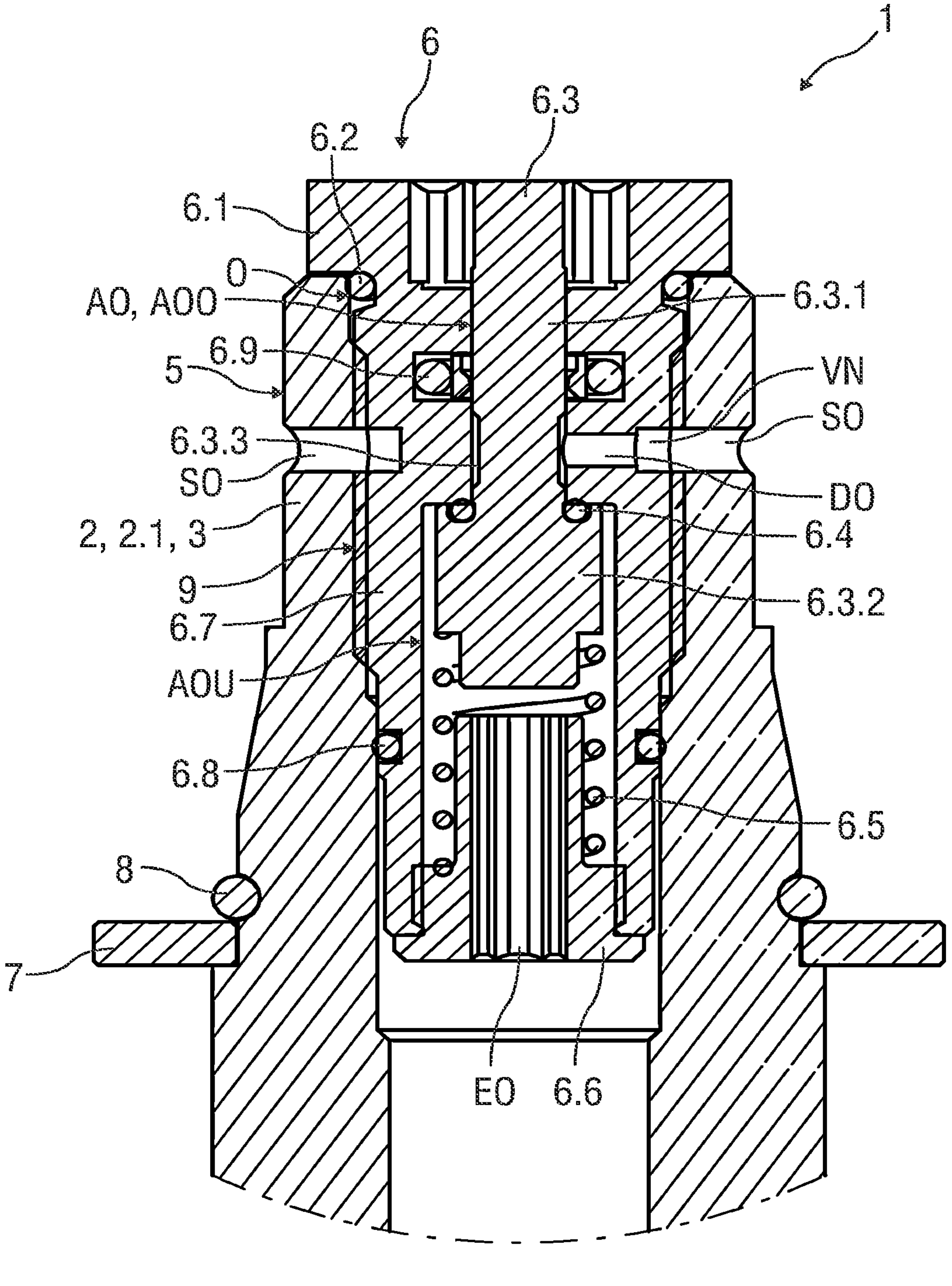
Figure 4:
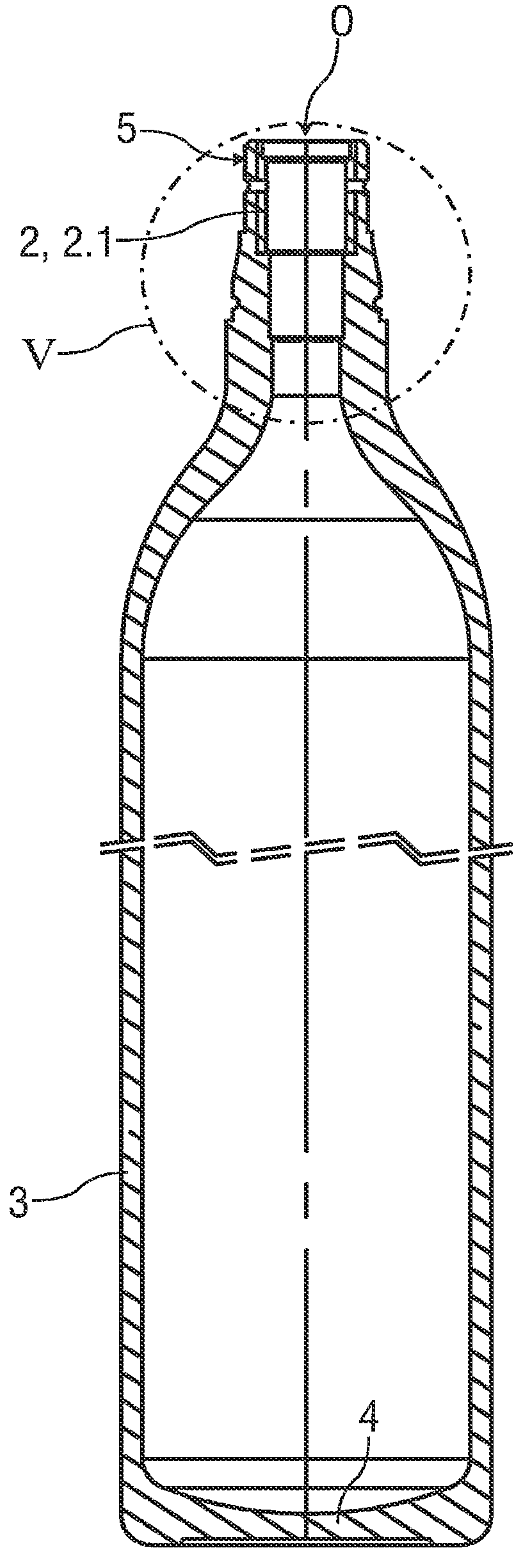
Figure 5:
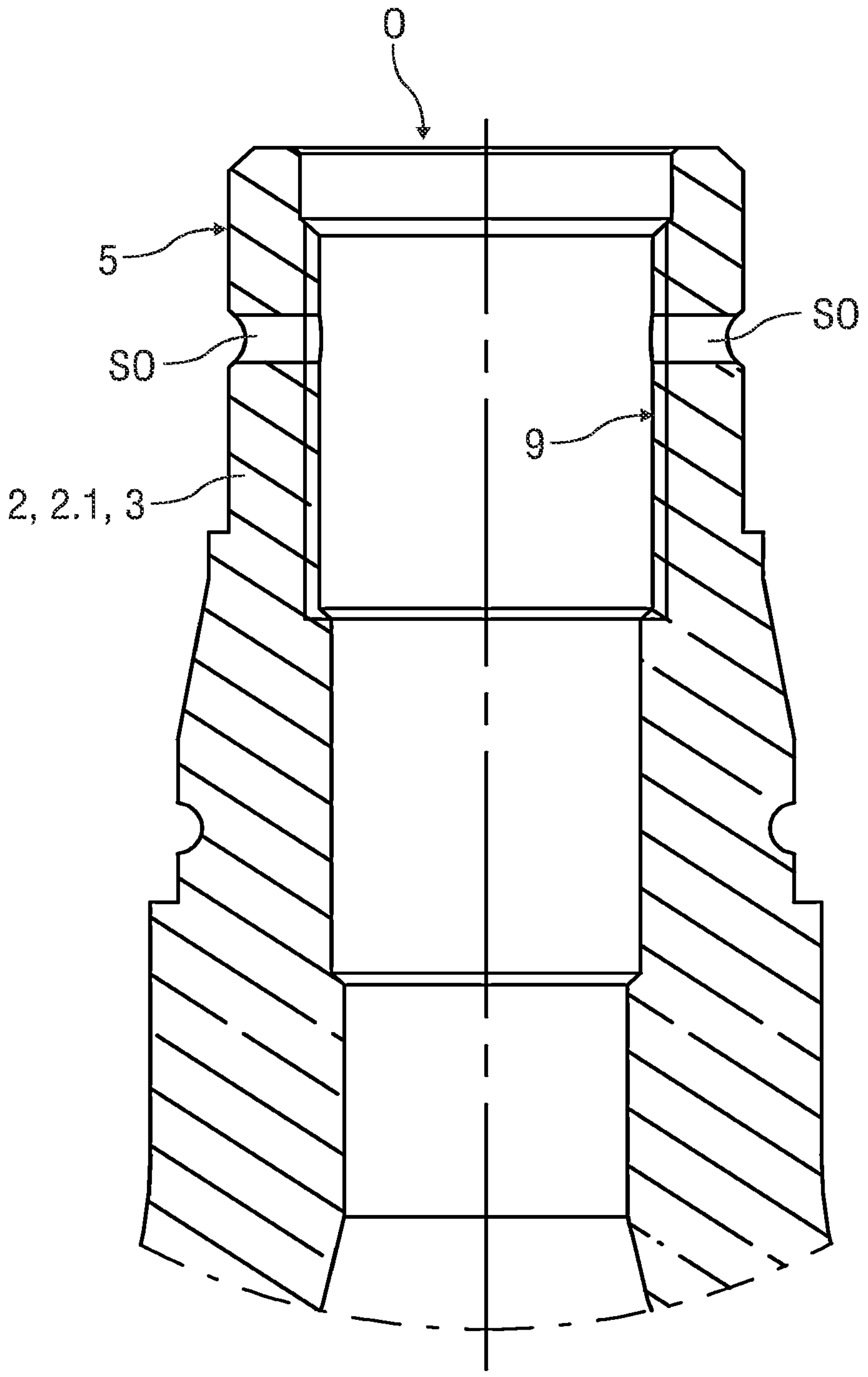
Figure 6:
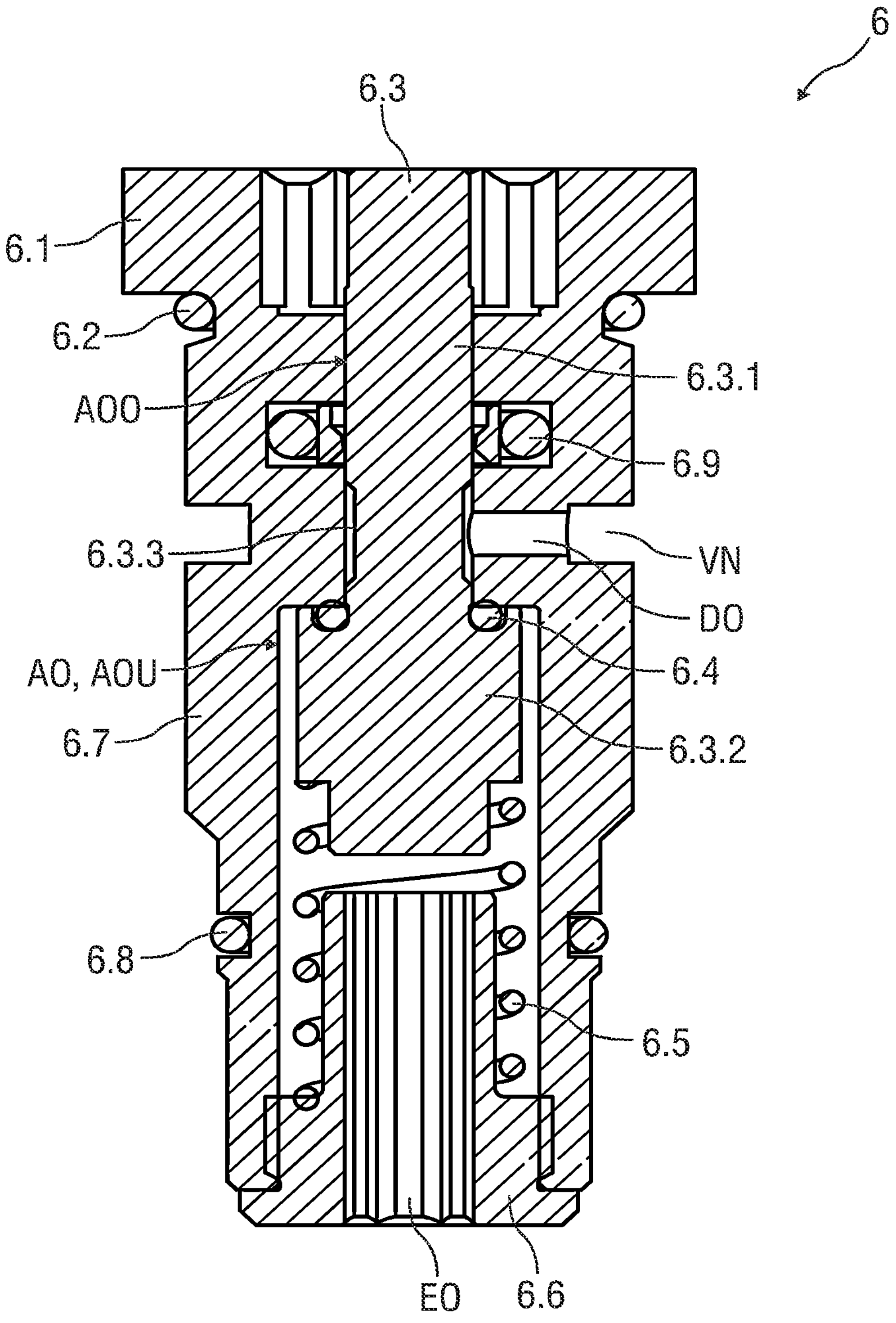

FIG. 2 shows a top view of the pressure vessel 1. FIG. 3 shows a detailed view of detail III in FIG. 1. FIG. 4 shows a longitudinal sectional view of a container body 3 of the pressure vessel 1. FIG. 5 shows a detailed view of detail V in FIG. 4 and FIG. 6 shows a longitudinal sectional view of a valve 6 of the pressure vessel 1.

The pressure container 1 is, for example, a pressurised gas container and is designed to hold a gas under high pressure. For example, the pressure container 1 is a so-called gas cartridge.

The pressure container 1 has the container body 3 with a container base 4 arranged at a lower end and in particular formed integrally with the container body 3.

At an upper end and thus opposite the container base 4, the container body 3 has an end region 2 which is in particular formed integrally with the container body 3. The end area 2 has an opening O.

The container base 4, the container body 3 and the end region 2 are in particular designed as a homogeneous, one-piece component without joints and are produced together in a forming process, for example a roll forming process, from a material blank, for example an aluminium blank or another material.

For a media-tight coupling of the pressure vessel 1 with an application, the pressure vessel 1 has, for example, a connection geometry 5 introduced on the outside of a wall 2.1 surrounding the opening O of the end region 2, which is designed, for example, as an external thread, for example as a so-called ACME thread. The wall 2.1, in particular comprising the connection geometry 5, forms a connection which is set up to be or to be coupled in a media-tight manner with a corresponding further connection of the corresponding application. The connection geometry 5 is produced, for example, during the forming of the end region 2 in the forming process and/or by means of machining after the forming and/or by applying material and/or other suitable processes.

The pressure vessel 1 further advantageously comprises the valve 6, in particular designed as a non-return valve. This valve 6 is arranged, at least substantially, within the end region 2. For this purpose, the pressure vessel 1 has a fastening structure 9 for the valve 6 formed on the inside of the wall 2.1 surrounding the opening O of the end region 2. The fastening structure 9 has in particular an internal thread arranged on the inside of the wall 2.1. A valve body 6.7 has an external thread corresponding to the internal thread of the fastening structure 9.

The valve 6 comprises the valve body 6.7, which is arranged with an upper collar-shaped valve body section 6.1 at the opening O of the end area 2. Starting from the opening O and from this collar-shaped valve body section 6.1, the valve body 6.7 projects into the end area 2.

The valve body 6.7 lies against the end region 2 in a media-tight manner. For this purpose, a diameter of the upper collar-shaped valve body section 6.1 of the valve body 6.7 is larger than an opening diameter of the opening O of the end region 2, whereby a contact surface facing the end region 2 is formed on the upper collar-shaped valve body section 6.1, which contacts an end face of the end region 2. In addition, a seal 6.2, in particular designed as an O-ring or shaft seal, is arranged between the valve body 6.7 and the end region 2. In particular, in a transitional area between the upper collar-shaped valve body section 6.1 and the section of the valve body 6.7 adjoining thereunder and projecting into the end region 2, this seal abuts against the valve body 6.7 and, in an opening edge area, abuts on the inside against the wall 2.1 of the end region 2 surrounding the opening O of the end region 2. In the examples shown, it is arranged in a receiving groove of the valve body 6.7. The valve body 6.7 is made of aluminium or brass or another material, for example.

The valve body 6.7 has a receiving opening AO running in the axial direction of the valve body 6.7 and penetrating it. This receiving opening AO has an upper receiving section AOO and an adjoining lower receiving section AOU, whereby the upper receiving section AOO has a smaller diameter than the lower receiving section AOU. The valve 6 also has a sealing plunger 6.3. The sealing plunger 6.3, which is shown in FIGS. 1 to 3 and 6 and also in FIG. 7 in a further embodiment of the valve 6 in a closed position, penetrates the upper receiving section AOO of the receiving opening AO and closes it in a fluid-tight manner.

In an open position not shown in more detail, the sealing plunger 6.3 releases the upper receiving section AOO of the receiving opening AO at least in sections. More precisely, in the open position, the sealing plunger 6.3 releases a lower passage section of the upper receiving section AOO of the receiving opening AO. In order to enable this valve function, i.e. the media-tight closure in the closed position and the release in the open position, a seal 6.4, in particular designed as an O-ring or shaft seal, is arranged between the sealing plunger 6.3 and the valve body 6.7.

In the illustrated example according to FIGS. 1 to 3 and 6, the sealing plunger 6.3 has an upper plunger section 6.3.1 arranged in the upper receiving section AOO of the receiving opening AO and an adjoining lower plunger section 6.3.2, wherein a diameter of the lower plunger section 6.3.2 is larger than a diameter of the upper plunger section 6.3.1 and also larger than a diameter of the upper receiving section AOO of the receiving opening AO. As a result, in the closed position, the sealing plunger 6.3 rests with an upper side of the lower plunger section 6.3.2 radially projecting beyond the upper plunger section 6.3.1 against an upper side of the lower receiving section AOU of the receiving opening AO radially projecting beyond the upper receiving section AOO of the receiving opening AO, with the seal 6.4 being arranged therebetween. It is arranged, for example, in a receiving groove of the lower plunger section 6.3.2. The sealing plunger 6.3 is made of aluminium or brass or another material, for example.

In the example shown, the sealing plunger 6.3 also has a diameter reduction 6.3.3 in the upper plunger section 6.3.1, in particular in the form of a circumferential groove. This is formed on the sealing plunger 6.3 in such a way that a lower edge region of the diameter reduction 6.3.3 in the open position, i.e. with the sealing plunger 6.3 moved downwards in the axial direction, is positioned below the upper side of the lower receiving section AOU of the receiving opening AO.

Exactly one passage opening DO is formed in the valve body 6.7, which extends radially outwards from the upper receiving section AOO of the receiving opening AO. The diameter reduction 6.3.3 is formed on the sealing plunger 6.3 in such a way that an upper edge region of the diameter reduction 6.3.3 is positioned above a lower opening edge of the passage opening DO in the open position, i.e. when the sealing plunger 6.3 is moved downwards in the axial direction. Thus, by moving the sealing plunger 6.3 into the open position, a fluidic connection is established between the lower receiving section AOU of the receiving opening AO, which is fluidically connected to a container interior of the container body 3, via the diameter reduction 6.3.3 in the sealing plunger 6.3 to the passage opening DO in the valve body 6.7. In the example shown, the passage opening DO opens into a circumferential distributor groove VN on an outer side of the valve body 6.7.

In the end area 2 of the container body 3, two outflow openings SO are formed opposite each other, each extending from an outer side to an inner side of the wall 2.1. These outflow openings SO are positioned at the level of the passage opening DO in the valve body 6.7. This refers to the valve 6 arranged in the end area 2 in a predetermined end position, i.e. to the valve 6 properly connected to the container body 3.

By moving the sealing plunger 6.3 into the open position, a fluidic connection is thus established between the lower receiving section AOU of the receiving opening AO, which is fluidically connected to the container interior of the container body 3, via the diameter reduction 6.3.3 in the sealing plunger 6.3, the passage opening DO in the valve body 6.7, the circumferential distributor groove VN in the valve body 6.7 and the two outflow openings SO in the end region 2 to an external environment of the pressure vessel 1, in particular for the outflow of the medium located in the interior of the vessel, in particular the gas, in particular into an application connected to the pressure vessel 1. In this case, the circumferential distributor groove VN ensures a, in particular uniform, distribution of the medium flowing out of the one passage opening DO to the two outlet openings SO.

In other embodiment examples, the circumferential distributor groove VN is formed, for example, in the wall 2.1 of the end region 2, i.e. on an inner side of the wall 2.1. It is then formed circumferentially around the end region 2. An inside inlet of the respective outflow opening SO is then positioned at a groove bottom of the circumferential distributor groove VN and the distributor groove VN is positioned at the level of the passage opening DO in the valve body 6.7. This also refers to the valve 6 arranged in the end area 2 in a predetermined end position, i.e. to the valve 6 properly connected to the container body 3.

In further embodiment examples, it can be provided, for example, that such a distributor groove VN is formed both in the valve body 6.7 and in the end area 2, respectively. Then the distributor groove VN in the end area 2 is positioned at the height of the distributor groove VN in the valve body 6.7. This also refers to the valve 6 arranged in a predetermined end position in the end region 2, i.e. to the valve 6 properly connected to the container body 3.

In order to prevent outflow past the valve 6 on the outside in the direction of the two outflow openings SO, a seal 6.8, in particular designed as an O-ring or shaft seal, is provided below the passage opening DO and the two outflow openings SO between the valve body 6.7 and the end region 2. In the example shown, it is arranged in a receiving groove in the valve body 6.7 and is thus in sealing contact with the valve body 6.7 and also with the end region 2.

To seal the valve 6 in the axial direction outwards above the passage opening DO, in order to prevent the medium from flowing out upwards through the receiving opening AO, a seal 6.9 is arranged above the passage opening DO, which is designed, for example, as an O ring or shaft seal. In the example shown, it is arranged in a receiving groove in the valve body 6.7 and is thus in sealing contact with the valve body 6.7 and also with the sealing plunger 6.3.

Furthermore, the valve 6 comprises a spring element 6.5, for example a helical spring, which presses the sealing plunger 6.3 in the axial direction against the valve body 6.7, whereby the spring element 6.5 in the example shown is compressed when the sealing plunger 6.3 moves from the closed position into the open position. This movement of the sealing plunger 6.3 takes place, for example, when the pressure vessel 1 is coupled to the application, wherein an actuating element is provided at the connection of the corresponding application, which presses the sealing plunger 6.3 in the direction of the vessel base 4 against the spring force when it is fastened to the connection geometry 5, for example, when the external thread is screwed into the connection, and thus establishes a fluidic connection between an interior of the pressure vessel 1 and the application.

To support the spring element 6.5 at an end facing away from the sealing plunger 6.3, the valve 6 has a support element 6.6 which is connected to the valve body 6.7. For example, the support element 6.6 comprises an external thread and the valve body 6.7 comprises a corresponding internal thread into which the support element 6.6 is screwed.

Inside the valve body 6.7, more precisely in the lower receiving section AOU of the receiving opening AO, the spring element 6.5 is arranged, which is supported with its first end on the support element 6.6 and with its opposite second end on the sealing plunger 6.3.

Due to the design of the valve 6, it can be screwed into the end section 2 as a whole.

To allow the medium to flow into the valve 6, the support element 6.6 has an inflow opening EO running through the support element 6.6, so that the medium can flow through the support element 6.6 into the lower receiving section AOU of the receiving opening AO and from there, when the valve 6 is in the open position, can flow through the valve 6 and the two outflow openings SO in the manner described.

On the outside of the end region 2, below the connection geometry 5, a stop disc 7 is arranged or formed integrally with the container body 3. This stop disc 7 forms, for example, an end stop for coupling the pressure vessel 1 to the application, for example by screwing the pressure vessel 1 into the application. In order to prevent an outflow past the end area 2 on the outside, a seal 8, in particular designed as an O-ring or shaft seal, is provided above the stop disc 7. In the example shown, it is arranged in a receiving groove in the end area 2 above the stop disc 7 and thus lies against the end area 2 in a sealing manner. In the state of the pressure vessel 1 with the application, it is also in sealing contact with a corresponding contact area of the application.

Figure 7:
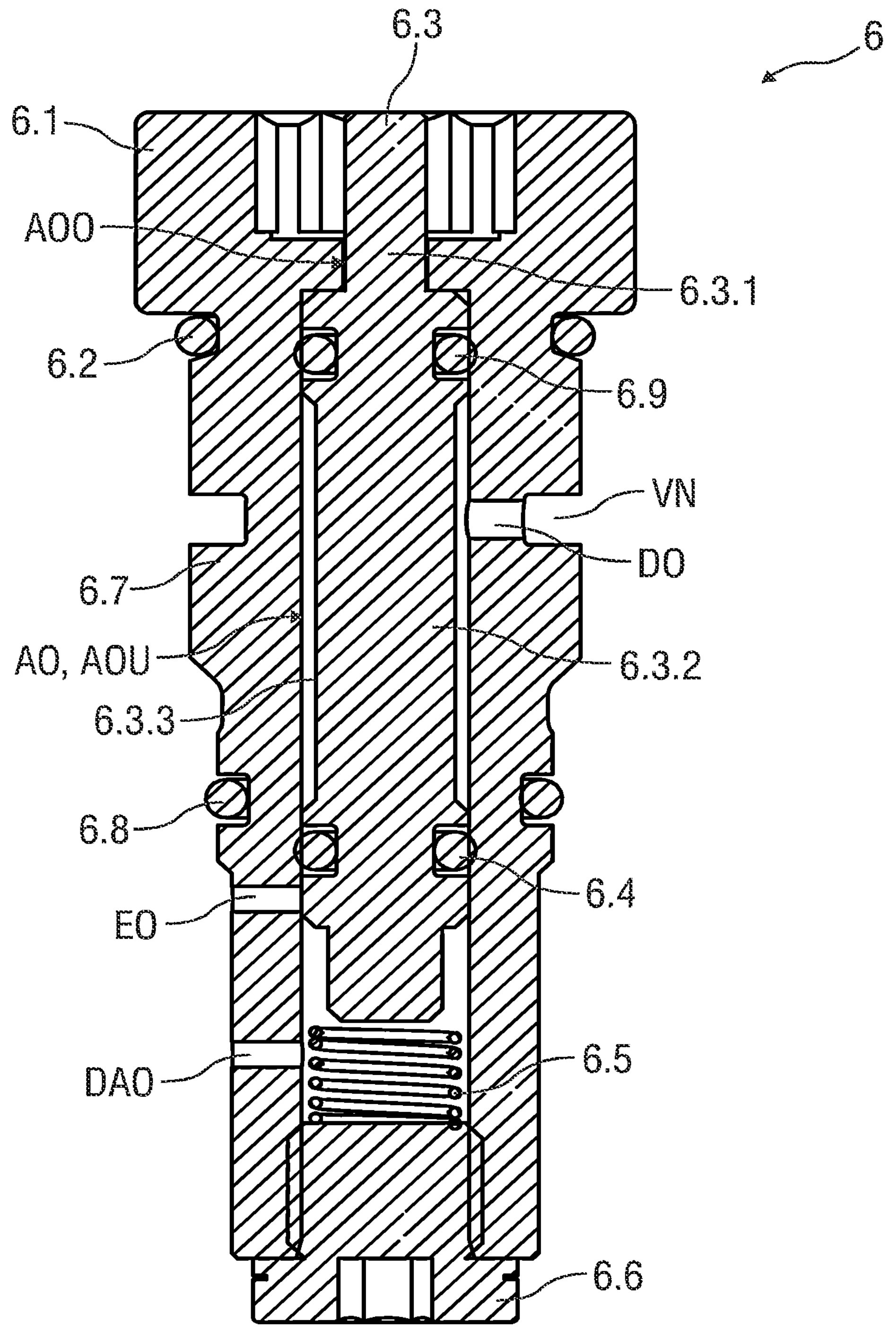

FIG. 7 shows a longitudinal sectional view of a valve 6 of a further embodiment of the pressure vessel 1. The vessel body 3 of the pressure vessel 1 not shown here, in particular its end region 2, is designed identically, for example, as shown in FIGS. 1 to 5 and described above, i.e. the difference in this embodiment of the pressure vessel 1 consists in a different embodiment of the valve 6.

In the following, this other embodiment of the valve 6 according to FIG. 7 will therefore be described. Here, too, the valve 6 is designed in particular as a non-return valve. In the finished state of the pressure vessel 1, this embodiment of the valve 6 is also arranged, at least essentially, within the end region 2. For this purpose, the pressure vessel 1 has the fastening structure 9 for the valve 6 formed on the inside of the wall 2.1 surrounding the opening O of the end region 2. The fastening structure 9 has in particular the internal thread arranged on the inside of the wall 2.1. The valve body 6.7 has the external thread corresponding to the internal thread of the fastening structure 9.

The valve 6 comprises the valve body 6.7, which is arranged with the upper collar-shaped valve body section 6.1 at the opening O of the end area 2. Starting from the opening O and from this collar-shaped valve body section 6.1, the valve body 6.7 projects into the end area 2.

The valve body 6.7 lies against the end region 2 in a media-tight manner. For this purpose, the diameter of the collar-shaped valve body section 6.1 of the valve body 6.7 is larger than the opening diameter of the opening O of the end region 2, whereby the contact surface facing the end region 2 is formed on the collar-shaped valve body section 6.1, which rests against the end face of the end region 2. In addition, the seal 6.2, which is designed in particular as an O ring or shaft seal, is arranged between the valve body 6.7 and the end region 2. In particular, in the transition area between the collar-shaped valve body section 6.1 and the section of the valve body 6.7 adjoining it below and projecting into the end region 2, this seal lies against the valve body 6.7 and, in an opening edge area, lies on the inside against the wall 2.1 of the end region 2 surrounding the opening O of the end region 2. The valve body 6.7 is made of aluminium or brass or another material, for example.

The valve body 6.7 has the receiving opening AO running in the axial direction of the valve body 6.7 and penetrating it. The valve 6 also has the sealing plunger 6.3, which closes the receiving opening AO in the valve body 6.7 in a fluid-tight manner. This receiving opening AO has the upper receiving section AOO and the lower receiving section AOU, whereby the upper receiving section AOO has a smaller diameter than the lower receiving section AOU. The sealing plunger 6.3, which is shown in the closed position in FIG. 7, penetrates the upper receiving section AOO of the receiving opening AO.

Furthermore, the valve 6 comprises the spring element 6.5, for example a helical spring, which presses the sealing plunger 6.3 in the axial direction against the valve body 6.7, whereby the spring element 6.5 in the example shown is compressed when the sealing plunger 6.3 moves from the closed position to the open position. This movement of the sealing plunger 6.3 takes place, for example, when the pressure vessel 1 is coupled to the application, wherein the actuating element is provided at the connection of the corresponding application, which presses the sealing plunger 6.3 in the direction of the vessel base 4 against the spring force when it is fastened to the connection geometry 5, for example when the external thread is screwed into the connection, and thus establishes a fluidic connection between the interior of the pressure vessel 1 and the application.

To support the spring element 6.5 at the end facing away from the sealing plunger 6.3, the valve 6 has the support element 6.6, which is connected to the valve body 6.7. For example, the support element 6.6 comprises the external thread and the valve body 6.7 comprises the internal thread corresponding thereto, into which the support element 6.6 is screwed.

Inside the valve body 6.7, more precisely in the lower section AOU of the receiving opening AO, the spring element 6.5 is arranged, which is supported with its first end on the support element 6.6 and with its opposite second end on the sealing plunger 6.3.

Due to the design of the valve 6, it can be screwed into the end section 2 as a whole.

In this embodiment of the valve 6, the support element 6.6 is closed. Therefore, in order to allow the medium to flow into the valve 6, the inflow opening EO is formed in the lower receiving section AOU of the receiving opening AO of the valve body 6.7. It runs radially through a wall of the valve body 6.7. This also allows the medium to flow into the lower receiving section AOU of the receiving opening AO and from there to flow through the valve 6 and the two outflow openings SO in the end area 2 of the container body 3 when the valve 6 is in the open position.

For this purpose, the sealing plunger 6.3 releases the receiving opening AO at least in sections in an open position not shown in greater detail. The passage section which the sealing plunger 6.3 releases in the open position is here a component of the lower receiving section AOU of the receiving opening AO. In order to enable this valve function, i.e. the media-tight closing in the closed position and the releasing in the open position, the seal 6.4, in particular designed as an O-ring or shaft seal, is arranged between the sealing plunger 6.3 and the valve body 6.7.

Also in this example according to FIG. 7, the sealing plunger 6.3 has the upper plunger section 6.3.1 arranged in the upper receiving section AOO of the receiving opening AO and the adjoining lower plunger section 6.3.2, whereby the diameter of the lower plunger section 6.3.2 is larger than the diameter of the upper plunger section 6.3.1 and is also larger than a diameter of the upper receiving section AOO of the receiving opening AO.

As a result, in the closed position the sealing plunger 6.3 rests with the upper side of the lower plunger section 6.3.2, which projects radially beyond the upper plunger section 6.3.1, against the upper side of the lower receiving section AOU of the receiving opening AO, which projects radially beyond the upper receiving section AOO of the receiving opening AO. However, this only serves here to hold the sealing plunger 6.3 upwards in the valve body 6.7 in the axial direction, i.e. to prevent the sealing plunger 6.3 from sliding upwards out of the valve body 6.7.

The seal 6.4 is arranged here on the circumference of the lower plunger section 6.3.2, in particular in a receiving groove. It is positioned on the sealing plunger 6.3 in such a way that in the closed position of the sealing plunger 6.3 it is positioned above the inflow opening EO in the valve body 6.7 and in the open position it is positioned below the inflow opening EO. This means that this seal 6.4 is moved past the inflow opening EO by the movement of the seal plunger 6.3. Thus, in the open position of the sealing plunger 6.3, the inflow of the medium into the lower receiving section AOU of the receiving opening AO and then through the valve 6 and the two outflow openings SO is enabled, and in the closed position this is prevented. The sealing plunger 6.3 is formed, for example, of aluminium or brass or another material.

Below the inflow opening EO, a pressure equalisation opening DAO is formed in the valve body 6.7, which also extends radially through the wall of the valve body 6.7. This prevents the lower region of the lower receiving section AOU of the receiving opening AO from being sealed by the seal 6.4 when the sealing plunger 6.3 is moved into the open position, which would cause excess pressure to build up in this lower region and thereby prevent or impede complete movement of the sealing plunger 6.3 into the open position.

In the example shown, the sealing plunger 6.3 has the diameter reduction 6.3.3 in the lower plunger section 6.3.2 in some areas, in particular in the form of a circumferential groove, which is wider here, in particular considerably wider than in the embodiment described above. This is formed on the sealing plunger 6.3 in such a way that a lower edge region of the diameter reduction 6.3.3 is positioned below an upper edge region of the inflow opening EO in the open position, i.e. when the sealing plunger 6.3 is moved downwards in the axial direction.

In the valve body 6.7, here too, exactly one passage opening DO is formed, which here extends radially outwards from the lower receiving section AOU of the receiving opening AO. The diameter reduction 6.3.3 in the form of the groove is formed on the sealing plunger 6.3 in such a way that it is positioned in the area of the passage opening DO both in the open position and in the closed position. Thus, by moving the sealing plunger 6.3 into the open position, a fluidic connection is established between the inflow opening EO, which is fluidically connected to the container interior of the container body 3, via the lower section of the receiving opening AO and the diameter reduction 6.3.3 in the sealing plunger 6.3 to the passage opening DO in the valve body 6.7. In the example shown, the passage opening DO opens into the circumferential distributor groove VN on the outside of the valve body 6.7.

Also in this embodiment of the pressure vessel 1, the two outflow openings SO in the end region 2 of the vessel body 3 are positioned at the level of the passage opening DO in the valve body 6.7. This refers to the valve 6 arranged in the end area 2 in a predetermined end position, i.e. to the valve 6 properly connected to the container body 3.

By moving the sealing plunger 6.3 into the open position, a fluidic connection is thus established between the inlet opening EO, which is fluidically connected to the vessel interior of the vessel body 3, via the lower receiving section AOU of the receiving opening AO, the diameter reduction 6.3.3 in the sealing plunger 6.3, the passage opening DO in the valve body 6.7, the circumferential distributor groove VN in the valve body 6.7 and the two outflow openings SO in the end region 2 to the outer environment of the pressure vessel 1, in particular for the outflow of the medium located in the interior of the vessel, in particular the gas, in particular into the application. In this case, the circumferential distributor groove VN ensures the, in particular uniform, distribution of the medium flowing out of the one passage opening DO to the two outlet openings SO.

In other embodiment examples, the circumferential distributor groove VN is formed, for example, in the wall 2.1 of the end region 2, i.e. on the inside of the wall 2.1. It is then formed circumferentially around the end region 2. The inside inlet of the respective outflow opening SO is then positioned at the groove bottom of the circumferential distributor groove VN and the distributor groove VN is positioned at the level of the passage opening DO in the valve body 6.7. This also refers to the valve 6 arranged in the end area 2 in a predetermined end position, i.e. to the valve 6 properly connected to the container body 3.

In further embodiment examples, it can be provided, for example, that such a distributor groove VN is formed both in the valve body 6.7 and in the end area 2. Then the distributor groove VN in the end area 2 is positioned at the height of the distributor groove VN in the valve body 6.7. This also refers to the valve 6 arranged in a predetermined end position in the end region 2, i.e. to the valve 6 properly connected to the container body 3.

In order to prevent the outflow past the valve 6 on the outside in the direction of the two outflow openings SO, in this embodiment of the valve 6 below the passage opening DO and the two outflow openings SO between the valve body 6.7 and the end region 2 the, seal 6.8, in particular designed as an O ring or shaft seal, is also provided. In the example shown, it is arranged in the receiving groove in the valve body 6.7 and is thus in sealing contact with the valve body 6.7 and also with the end region 2.

To seal the valve 6 in the axial direction outwards above the passage opening DO, in order to prevent the medium from flowing out upwards through the receiving opening AO, the seal 6.9 is arranged above the passage opening DO, which is designed, for example, as an O ring or shaft seal. In the example shown, it is arranged in a receiving groove in the sealing plunger 6.3 and thus lies in sealing contact with the sealing plunger 6.3 and also with the valve body 6.7.

In summary, in both embodiments of the pressure vessel 1, a seal 6.2, 6.8 is arranged between the valve body 6.7 and the end region 2 above and below the passage opening DO respectively. The seal 6.2 above the outlet opening DO prevents the medium from flowing out of the opening O in the end area 2 upwards out of the container body 3. The seal 6.8 below the outlet opening DO prevents the medium from flowing between the wall 2.1 of the end area 2 and the valve body 6.7 and thus past the valve 6 in the direction of the outlet openings SO in the wall 2.1 of the end area 2.

Two seals 6.4, 6.9 are also arranged between the valve body 6.7 and the sealing plunger 6.3 in the two embodiments of the pressure vessel 1. In this case, one seal 6.9 is arranged above the passage opening DO in order to prevent the medium from flowing out of the receiving opening AO upwards, so that it is ensured that the medium flows out laterally exclusively via the two lateral outflow openings SO. The other seal 6.4 is arranged below the passage opening DO. With it, the fluidic connection between the passage opening DO and the area of the receiving opening AO fluidically connected to the interior of the container body 3 is prevented in the closed position of the sealing plunger 6.3 and released in the open position of the sealing plunger 6.3.

In both embodiments of the pressure vessel 1, the passage opening DO is fluidically connected to the receiving opening AO and the sealing plunger 6.3 closes the receiving opening AO and thereby also the passage opening DO in a media-tight manner in the closed position and releases the receiving opening AO at least in sections in the open position and thereby also releases the passage opening DO. The passage opening DO is thus closed in a media-tight manner by means of the sealing plunger 6.3 in the closed position, in particular indirectly, by closing the receiving opening AO and thereby the passage opening DO fluidically connected thereto in a media-tight manner.

REFERENCE LIST

1 pressure vessel
2 end section
2.1 wall
3 vessel body
4 vessel bottom
5 connection geometry
6 valve
6.1 collar-shaped valve body section
6.2 seal
6.3 sealing plunger
6.3.1 upper plunger section
6.3.2 lower plunger section
6.3.3 diameter reduction
6.4 seal
6.5 spring element
6.6 support element
6.7 valve body
6.8 seal
6.9 seal
7 stop disc
8 seal
9 fastening structure
AO receiving opening
AOO upper receiving section
AOU lower receiving section
DAO pressure equalisation opening
DO passage opening
EO inflow opening
O opening
SO outlet opening
VN distributor groove

What is claimed is:

1. A pressure vessel, comprising:

a container body having an upper end, wherein at the upper end an end region is formed in one piece with the container body, wherein the upper end has an opening, and a fastening structure formed on an inside of a wall surrounding the opening of the end region, a valve arranged in the opening of the end region, wherein a valve body of the valve has exactly one passage opening which is formed radially from an inner side towards an outer side of the valve body, and wherein at least two outflow openings are formed for the valve in the wall surrounding the opening of the end region.

2. The pressure vessel according to claim 1, wherein the at least two outflow openings are arranged opposite one another.

3. The pressure vessel according to claim 1, wherein the passage opening in the valve body is positioned at a level of the at least two outflow openings in the end region.

4. The pressure vessel according to claim 1, wherein the passage opening opens into a distributor groove formed circumferentially on an outside of the valve body therein.

5. The pressure vessel according to claim 1, wherein an inner opening edge of each of the at least two outflow openings is arranged on a groove bottom of a circumferential distributor groove formed on the inside of the wall of the end region.

6. The pressure vessel according to claim 1, wherein the fastening structure has an internal thread arranged on the inside of the wall.

7. The pressure vessel according to claim 6, wherein the valve body has an external thread corresponding to the internal thread of the fastening structure, the valve body being arranged in the region of a opening of the end region when screwed into the internal thread, projecting from the opening into the end region, bearing against the end region in a media-tight manner and having a receiving opening in which a sealing plunger is arranged, which in a closed position closes the passage opening in a media-tight manner and in an open position releases the passage opening, wherein the valve has a support element connected to the valve body or formed on the valve body and a spring element arranged inside the valve body, which is supported with a first end on the support element and with an opposite second end on the sealing plunger, wherein the spring element is tensioned during a movement of the sealing plunger from the closed position into the open position.

8. The pressure vessel according to claim 7, wherein the passage opening is fluidically connected to the receiving opening and the sealing plunger in the closed position closes the receiving opening and thereby also the passage opening in a fluid-tight manner and in the open position releases the receiving opening at least in sections and thereby also releases the passage opening.

9. The pressure vessel according to claim 1, wherein at least one of a support element and the valve body has an inflow opening.

10. The pressure vessel according to claim 1, wherein the valve body has a pressure equalisation opening.

11. The pressure vessel according to claim 1, wherein the container body has a container base arranged at a lower end and formed integrally with the container body.

12. The pressure vessel according to claim 1, wherein the container body has a connection geometry arranged on an outside of a wall surrounding the opening of the end region.

13. The pressure vessel of claim 1, wherein the at least two outflow openings are arranged for one-way lateral outflow from the valve.

14. The pressure vessel of claim 13, wherein the at least two outflow openings are arranged for one-way lateral outflow from the valve through the wall of the wall of the container body.

15. The pressure vessel of claim 1, wherein the valve is arranged for longitudinal outflow and/or inflow.

16. The pressure vessel of claim 1, wherein an upper collar of the valve rests on the upper end of the container body, wherein the at least two outflow openings are arranged in the container body and the exactly one passage opening of the valve are arranged below the upper collar, wherein a movable plunger longitudinally extends within the valve from the upper collar and below the exactly one passage opening and the at least two outflow openings.

17. The pressure vessel of claim 16, wherein a fixed support element is located below the sealing plunger in the valve.

18. The pressure vessel of claim 17, wherein a biasing member is located about the fixed support element and is in contact with the plunger to selectively bias the plunger away from the fixed support element.

19. A pressure vessel, comprising:

a container body having an upper end, wherein at the upper end an end region is formed in one piece with the container body, wherein the upper end has an opening, wherein the container body has at least one outflow opening below the upper end, and a valve located at least partially in the opening, wherein the valve has an upper collar that rests on the upper end forming the opening and a valve body depending downwardly from the upper collar into the container body, and wherein an outflow opening in the valve body is vertically aligned with the at least one outflow opening of the container body, wherein a sealing plunger adapted for selective longitudinal movement in the valve body extends from the upper end.

* * * * *